(12) United States Patent
Hirota et al.

(10) Patent No.: US 11,879,533 B2
(45) Date of Patent: Jan. 23, 2024

(54) DIFFERENTIAL DEVICE

(71) Applicant: GKN Automotive Limited, Birmingham (GB)

(72) Inventors: Isao Hirota, Tochigi (JP); Manabu Endou, Tochigi (JP); Masato Horiguchi, Tochigi (JP)

(73) Assignee: GKN Automotive Limited, Birmingham (GB)

(*) Notice: Subject to any disclaimer, the term of this patent is extended or adjusted under 35 U.S.C. 154(b) by 0 days.

(21) Appl. No.: 17/980,588

(22) Filed: Nov. 4, 2022

(65) Prior Publication Data

US 2023/0052929 A1   Feb. 16, 2023

Related U.S. Application Data

(63) Continuation of application No. PCT/JP2020/020518, filed on May 25, 2020.

(51) Int. Cl.
*F16H 48/22* (2006.01)
*F16H 48/08* (2006.01)
*F16H 48/38* (2012.01)

(52) U.S. Cl.
CPC ............ *F16H 48/22* (2013.01); *F16H 48/08* (2013.01); *F16H 2048/085* (2013.01); *F16H 2048/387* (2013.01)

(58) Field of Classification Search
CPC ......... F16H 2048/085; F16H 2048/387; F16H 48/08; F16H 48/22
See application file for complete search history.

(56) References Cited

FOREIGN PATENT DOCUMENTS

| JP | H06-76748 U1 | 10/1994 |
| JP | H11-82682 A | 3/1999 |
| JP | 2000283263 A | 10/2000 |
| JP | 2000291777 A | 10/2000 |
| JP | 2017215015 A | 12/2017 |

OTHER PUBLICATIONS

International Search Report and Written Opinion for PCT/JP2020/020518 dated Jul. 14, 2020 (9 pages; with English translation).

*Primary Examiner* — Edwin A Young
(74) *Attorney, Agent, or Firm* — Bejin Bieneman PLC

(57) ABSTRACT

A differential device is provided with: a casing rotatable about an axis; a differential gear set including a pair of side gears housed in the casing and rotatable about the axis, a pinion shaft penetrating perpendicular to the axis and being secured to the casing; and pinion gears rotatably supported by the pinion shaft and so meshed with the side gears as to enable differential motion between the side gears; friction clutches interposed between the side gears and an inner periphery of the casing to limit the differential motion; a pair of repulsive bodies respectively applying force in directions along the axis to the friction clutches; and a block in contact with and supporting in the directions along the axis both the repulsive bodies, the block so fitting on the pinion shaft as to impose reaction forces from the friction clutches on the pinion shaft.

5 Claims, 3 Drawing Sheets

DIFFERENTIAL DEVICE

CROSS-REFERENCE TO RELATED APPLICATIONS

This application is a continuation Application of, and as such claims priority to, PCT International Application No. PCT/JP2020/020518 (filed May 25, 2020), the entire contents of which are incorporated herein by reference.

BACKGROUND

As right and left axles in a vehicle do not necessarily rotate in an equal speed, it is required to allow differential motion therebetween. To enable differential motion between both the axles, a differential device is used.

Although a differential device effectively transmits torque to both axles when both wheels have traction on the road, the differential device will fail to transmit torque to any of the axles if one of the wheels loses traction and the differential motion by the other is still enabled. One of means for avoiding such a situation is a so-called limited-slip differential (LSD). The LSD is provided with a friction clutch for example, which responds to torque acting on itself, and the friction clutch limits differential motion (torque-sensitive LSD).

Various types of torque-sensitive LSDs are known. A planetary gear type that uses friction on tooth flanks of planetary gears to create force for pressurizing a clutch, a multi-plate type that uses stacked multiple plates as a friction clutch, and a cone clutch type that uses a cone clutch are examples therefor.

Any of these types cannot avoid some delay before starting the limiting function and thus, particularly when a vehicle starts moving or momentarily loses traction even while moving, the vehicle cannot exert its driving force. Some measures have been proposed, in which a pressure force is made to act on a friction clutch so that it is in advance given some torque (initial torque) before the LSD responds to the torque.

The PTLs 1 and 2 in the following lists disclose related arts.

CITATION LIST

Patent Literature

PTL 1: Japanese Patent Application Laid-open No. H11-82682
PTL 2: Japanese Patent Application Laid-open No. 2000-283263

SUMMARY

The disclosure herein relates to a limited-slip differential (LSD) device, and in particular to a LSD device that steadily limits differential motion to some extent.

Any of the arts disclosed in the PTLs 1 and 2 uses a powerful spring to steadily give pressure force to a multi-plate clutch and may be effective to some extent. Its powerful repulsive force, however, may give rise to another problem in production processes of devices in practice. More specifically, when a device disclosed in the PTL 2 is to be assembled, a pinion shaft must be pressed into the device against repulsive force by disc springs and necessarily gets scratches by the disc springs. As pinion gears are directly in contact with these scratches and then rotate thereon, the scratches might bar smooth rotation or accelerate wearing. Any alternative production method may be possible, in which the differential case is divided at its center and then the pinion shaft is installed therein and thereafter the divided case is recombined by tightening with bolts or such. It requires the differential case to have a relatively large flange for tightening and thus compactness thereof may be greatly impaired. Reduction of the repulsive force may be a solution as far as prevention of scratches is concerned but this inherently causes reduction of the initial torque. The device disclosed hereinafter had been created in light of the problem.

According to an aspect, a differential device is provided with: a casing rotatable about an axis; a differential gear set including a pair of side gears housed in the casing and rotatable about the axis, a pinion shaft penetrating perpendicular to the axis and being secured to the casing, whereby being rotatable along with the casing about the axis; and pinion gears rotatably supported by the pinion shaft and so meshed with the side gears as to enable differential motion between the side gears; friction clutches interposed between the side gears and an inner periphery of the casing to limit the differential motion; a pair of repulsive bodies respectively applying force in directions along the axis to the friction clutches; and a block in contact with and supporting in the directions along the axis both the repulsive bodies, the block so fitting on the pinion shaft as to impose reaction forces via the repulsive bodies from the friction clutches on the pinion shaft.

DESCRIPTION OF EMBODIMENTS

Exemplary embodiments will be described hereinafter with reference to the appended drawings. Throughout the following descriptions and appended claims, unless otherwise described, an axis means a rotation axis of a differential device, an axial direction means a direction parallel to the axis and a radial direction means a direction perpendicular thereto. In the following description, distinctions between right and left would be given but are only for convenience of explanation. Any embodiments where right and left are reversed will occur, of course.

Figure 1:
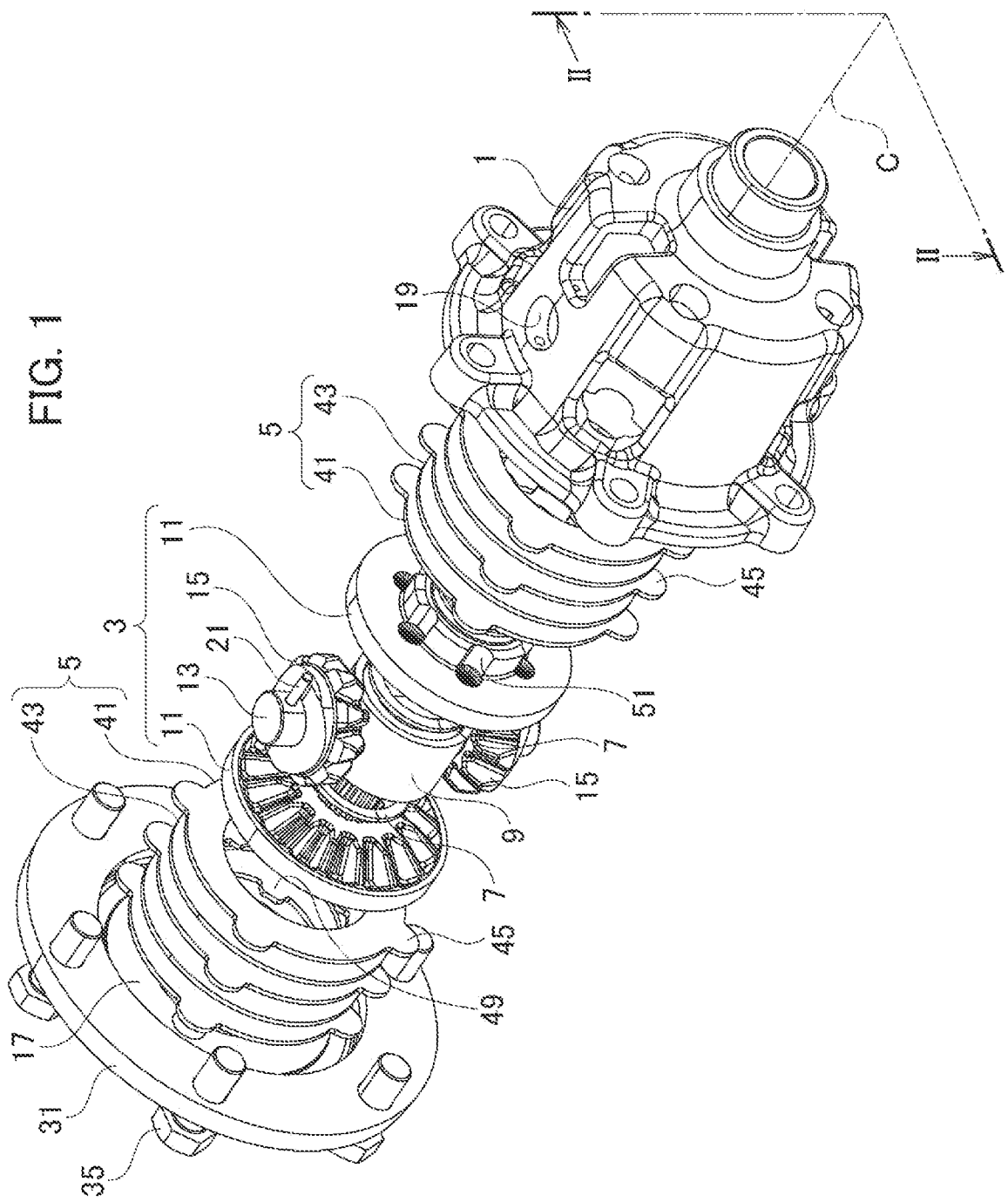
FIG. 1 is an exploded perspective view of a differential device.
Figure 2:
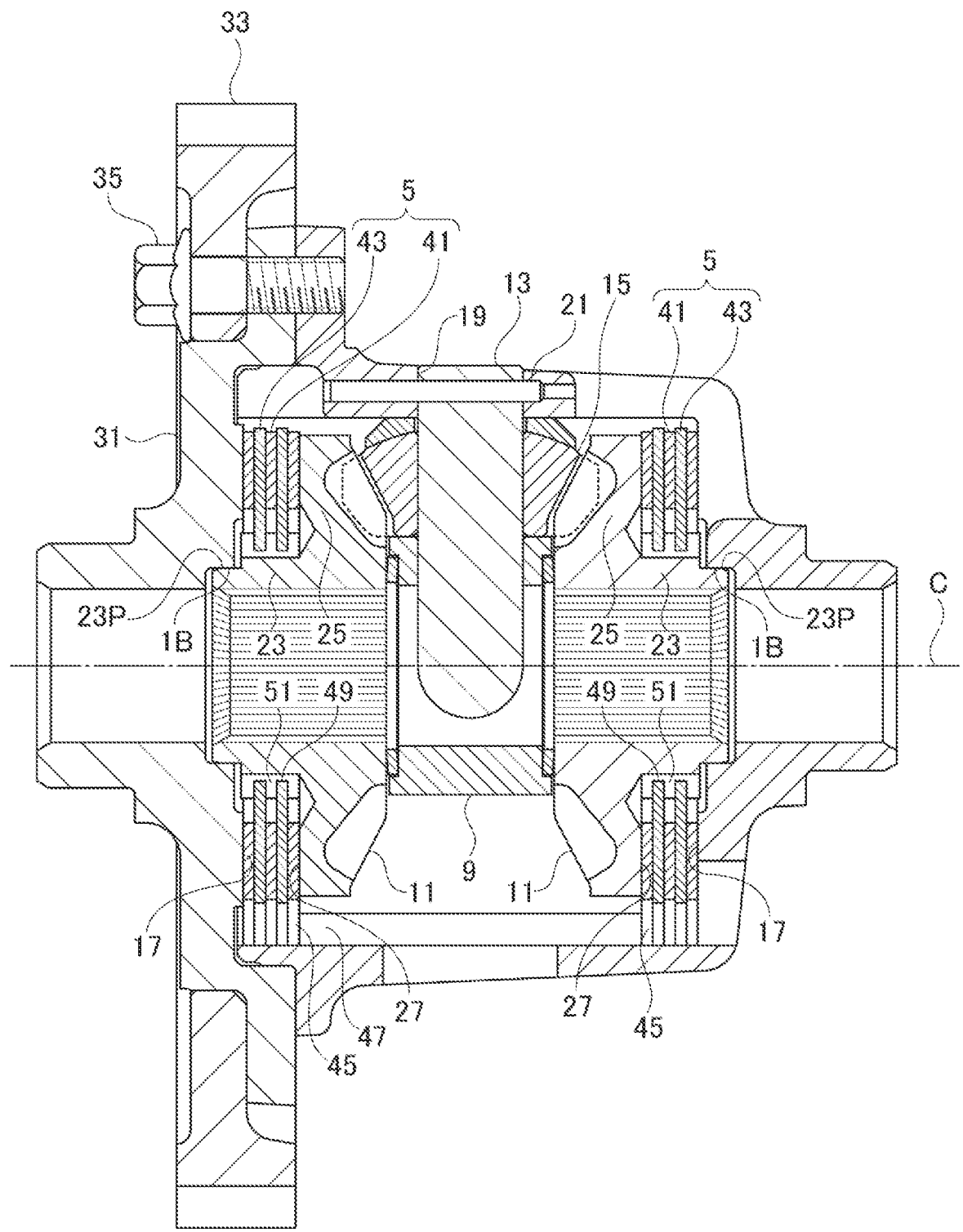
FIG. 2 is a sectional view of the differential device, taken from the line II-II of FIG. 1.

Referring to FIGS. 1 and 2, a differential device of the present embodiment is applicable to use for outputting torque about an axis C to a pair of (generally, right and left) axles while allowing differential motion therebetween for example. Alternatively, it is applicable to use for intervening on a propeller shaft that connects front and rear sections to distribute torque to front and rear driving wheels, or to any various uses for intermediating torque transmission. The following descriptions relate to examples where torque is distributed to axles but are only for convenience of explanation.

The differential device is in general provided with a casing 1 receiving torque to rotate about the axis C, a differential gear set 3 drivingly coupled with the casing 1 to transmit the torque to both axles while allowing differential motion therebetween, a pair of friction clutches 5 for limiting the differential motion when receiving pressure force, a pair of repulsive bodies 7 applying force axially to the friction clutches 5, and a block 9 supporting back faces of the repulsive bodies 7.

The casing 1 is generally cylindrical and is, by means of boss portions projecting from both ends thereof, rotatably supported. The casing 1 may be a one-piece type but may be a two-type where it is divisible into two pieces for the convenience of carrying-in internal components. In the example shown in the drawings, the casing 1 is divisible into a main body, which is to house and support the gear set 3 and the friction clutches 5, and a cover 31 for covering one end of the main body, but the main body is formed in a unitary body indivisible anymore. The cover 31 is, along with a ring gear 33 for example, tightened with the main body by means of bolts 35 to constitute the casing 1. The casing 1 receives torque through the ring gear 33 and thereby rotates about the axis C.

The casing 1 is, on a side face of the main body thereof, provided with a shaft hole 19 and, being symmetrical thereto relative to the axis C, another shaft hole 19, which are used for supporting a pinion shaft 13 described later. On the internal periphery of the main body, a plurality of slots 47 runs in parallel with the axis C, which is to engage with tabs 45 of outer plates 27 described later.

The differential gear set 3 may be a so-called bevel gear type where gear teeth of the pinion gears and the side gears are respectively beveled as shown in the drawings, but may be a face gear type although not shown. Although the bevel gear type or the face gear type readily enables the embodiments described below, any other type may be applicable if possible.

The differential gear set 3, generally housed in the casing 1, is provided with a pair of side gears 11 corresponding to the pair of axles. The differential gear set 3 is further provided with a pinion shaft 13 fixedly supported by the casing 1 thereby rotating together about the axis C, the casing 1, and a plurality of pinion gears 15 rotatably supported by the shaft 13. The engagement of the pinion gears 15 with the side gears 11 enables relative rotation between the side gears 11. The combination of the pinion gears 15 and the side gears 11 mutually in mesh is capable of transmitting torque so that the torque received by the pinion shaft 13 is transmitted to the pair of side gears 11 while differential motion therebetween is allowed.

Each pinion gear 15 has gear teeth on its outer periphery to mesh with the side gears 11. Along its axial center bored is a smooth cylindrical through-hole, and, as the pinion shaft 13 is passed through the through-hole, each pinion gear 15 is rotatable thereabout.

The pinion shaft 13 that is generally cylindrical and has a smooth surface penetrates and is coupled with the casing 1 from one shaft hole 19 to the other shaft hole 19, intersecting and perpendicular to the axis C, in the radial direction. While a pin 21 is applicable for the purpose of securing it to the casing 1, the pin 21 is inserted in parallel with the outer periphery of the casing 1 but perpendicular to the pinion shaft 13 and penetrates both, thereby fixing the pinion shaft 13 to the casing 1.

Each side gear 11 is composed of a generally cylindrical hub section 23 and a gear section 25 radially outwardly expanding from the hub section 23. The internal periphery of the hub section 23 is provided with a structure for coupling with the axle, splines for example, but any other coupling means is applicable. The outer periphery of the hub section 23 may be provided with lug slots 51 for example in order to couple with lugs 49 of inner plates 43 described later.

The gear section 25 is, on the side facing the pinion gears 15, provided with gear teeth for engaging therewith, and the back side thereof is a generally flat clutch face 27. The clutch face 27 is an element related to the aforementioned friction clutch 5 and is, in a case where the friction clutches 5 are multi-plate clutches as described later, a face for applying pressure to its clutch plates.

Each hub section 23 is, on the end opposed to the gear section 25, provided with a pivot section 23P, and the casing 1 is correspondingly provided with bearing sections 1B. Each pivot section 23P is so dimensioned as to rotatably fit in the bearing section 1B and this fitting puts each side gear 11 in place relative to the axis C. Each side gear 11 is mainly only at the pivot section 23P in contact with the casing 1, and is capable of being put in place via this contact and support by the friction clutch 5, and as well by indirect support by the pinion shaft 13. No other means for placing them is not required.

In the casing 1, inner faces 17 respectively opposed to the clutch faces 27 are both flat and elements related to the friction clutches 5. Although the combination of the inner faces 17 and the clutch faces 27 in direct contact, or indirect contact having any proper intervening friction plates, may constitute the friction clutches 5, preferably the friction clutches 5 may be formed of multi-plate clutches interposed between the side gears 11 and the inner faces 17 of the casing 1.

Each multi-plate clutch is provided with outer plates 41 and inner plates 43 stacked mutually and alternately, which are flat disks perpendicular to the axis C. These disks are of any wear-resistant material such as a low carbon steel while any friction members such as carbon-fiber members may adhere to any one or more of them.

Each outer plate 41 is provided with a plurality of tabs 45 projecting radially outward and is anti-rotated relative to the casing 1 as these tabs 45 engage with slots 47 on the casing 1. Each inner plate 43 is provided with a plurality of lugs 49 projecting radially inward and is anti-rotated relative to the side gear 11 as these lugs 49 engage with the lug slots 51. Therefore the friction clutches 5, when receiving pressure force in the axial direction, exert braking action on the side gears 11 relative to the casing 1, thereby limiting differential motion between the side gears 11.

The repulsive bodies 7 may be interposed respectively between the block 9 and the side gears 11 and, by these repulsive forces, do press the side gears 11 toward the friction clutches 5. As the block 9 supports the back faces of the repulsive bodies 7, the block 9 bears the reaction forces.

While any element capable of creating sufficient repulsive force is applicable to each repulsive body 7, one suitable example is a so-called disc spring that is of a repulsive material such as a spring steel, which is a round plate but projecting slightly toward its center. This may be a plurality of stacked disc springs or any other type of a spring. In a case of a disc spring, each may be tapered in a direction toward each side gear 11. As this direction makes the inner periphery of the repulsive body 7 be contact with the side gear 11 and the outer periphery be contact with the block 9, when the side gear 11 rotates relative to the block 9, the repulsive body 7 stays on the block 9 and is thus not dragged by the side gear 11 to rotate. As the repulsive bodies 7 must not rub the block 9, abrasion of the block 9 can be effectively prevented even if it is of a relatively soft material.

The block 9 is, although not necessarily, a cylinder around the axis C for example, and has through-holes through which the pinion shaft 13 passes. The block 9, at both ends thereof respectively, gets contact with the repulsive bodies 7 to bear these reaction forces. The through-holes and the pinion shaft 13 are so dimensioned as to closely fit with each other, so the pinion shaft 13 ultimately bears the reaction forces applied by the friction clutches 5. The contact of these elements is close enough to make the pinion shaft 13 bear the reaction forces but is allowed to have little play not to prevent smooth insertion of the pinion shaft 13 into the through-holes.

The aforementioned differential device can be assembled in a way as described below. Referring mainly to FIG. 1, first the right friction clutch 5 along with the right side gear 11 is carried in the casing 1. Next the right repulsive body 7 and the block 9 are carried therein and then the pinion gears 15 are made to mesh with the right side gear 11. It is noted that, at this stage, the pinion shaft 13 is not yet installed in.

Referring to FIG. 2 in combination with FIG. 1, by use of any proper jig, the block 9 is pressed against the repulsive force by the repulsive body 7 toward the right side gear 11. As the shaft holes 19 of the casing 1, the through-holes of the pinion gears 15 and the through-holes of the block 9 then come into line, the pinion shaft 13 can be inserted through these holes. As the repulsive forces applied to the block 9 are canceled by the jig and further little play is held between the through-holes and the pinion shaft 13 as described already, no pressure is required in this insertion. Scratch formation on the surface of the pinion shaft 13 is therefore prevented.

By inserting the pin 21, the pinion shaft 13 is secured to the casing 1. Even though the jig were remove, as the block 9 then gets close contact with the pinon shaft 13 to resist the repulsive force by the repulsive body 7, respective components would not fall off from the casing 1.

Next, the left repulsive body 7 is put on the block 9 and the left side gear 11 along with the friction clutch 5 is carried in the casing 1. The cover 31 is pressed against the repulsive forces and is then, along with the ring gear 33, tightened to the main body of the casing 1, thereby completing the assembly of the differential device. This pressure would not affect the internal components, as the block 9, even when the cover 31 being pressed, resists this pressure.

Figure 3:
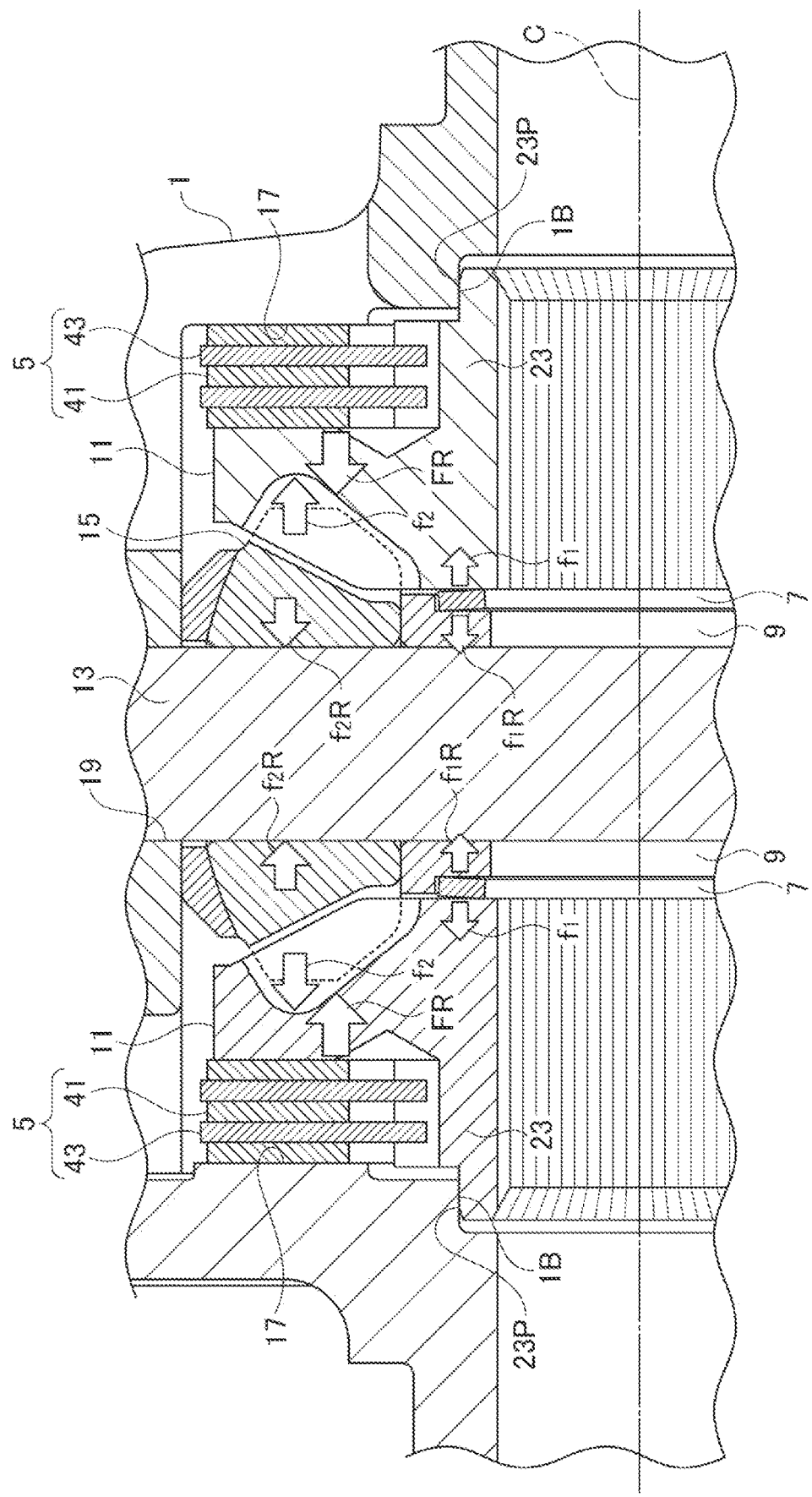
FIG. 3 is a partial sectional view in which side gears, disc springs and a block are particularly enlarged.

Referring to FIG. 3, the differential device of the present embodiment operates in ways described below.

When the right and left axles have no difference in rotational speed, the casing 1, the side gears 11, and the pinion shaft 13 unitarily rotate or stall about the axis C. Even then the repulsive bodies 7 apply preliminary forces f1 to the side gears 11 and these forces f1 extend to the friction clutches 5, so limiting force comes out in the differential gear set in advance. As the reaction forces f1R applied to the block 9 on its right and left then balance together, the respective components keep these stable positions even though the pinion shaft 13 does not support the block 9.

When the right and left axles start creating some difference in rotational speed, the side gears 11 start rotating while meshing with the pinion gears 15, thereby creating engagement forces f2. These engagement forces f2 urge the side gears 11 outward in the axis C, and, with the preliminary forces f1, create greater net forces that respectively act on the friction clutches 5, thereby increasing the limiting force in the differential gear set.

On the other hand, the friction clutches 5 create reaction forces FR, some portions f2R of which are borne by the pinion gears 15 and the other portions f1R of which are borne by the block 9 via the repulsive bodies 7. The pinion shaft 13 support all these components and thus the casing 1 ultimately bears the forces. It is to be noted here that the pressing force and the reaction force balance and are canceled out within the right half of the casing 1 and the same does within the left half, or more specifically the one half does not affect the other half. Although reaction forces in the right and left halves might differ according to any difference in speed or in traction between the right and left wheels, the difference would not affect the operation of the differential gear set.

Because the side gears 11 are free from applied forces aside from those along the axis C, and are supported by the friction clutches 5 perpendicular to the axis C, the side gears 11 are not decentered from the axis C. The side gears 11 are set in place only by the bearing sections 1B and keep stable there. The side gears 11 do not require any other means such as support at these outer peripheries.

Although certain exemplary embodiments are described above, modifications and variations of the embodiments will occur to those skilled in the art, in light of the above teachings.

What is claimed is:

1. A differential device, comprising:
    a casing rotatable about an axis;
    a differential gear set including
        a pair of side gears housed in the casing and rotatable about the axis,
        a pinion shaft penetrating perpendicular to the axis and being secured to the casing whereby the pinion shaft is rotatable along with the casing about the axis, and
        pinion gears rotatably supported by the pinion shaft and so meshed with the side gears as to enable differential motion between the side gears;
    friction clutches interposed between the side gears and an inner periphery of the casing to limit the differential motion;
    a pair of repulsive bodies respectively applying force in directions along the axis to the friction clutches; and
    a block in contact with and supporting, in the directions along the axis, both the repulsive bodies, wherein the block fits on the pinion shaft so as to impose reaction forces via the repulsive bodies from the friction clutches on the pinion shaft, wherein the repulsive bodies are respectively interposed between the block and the side gears to impose the reaction forces on the block,
    wherein the pair of repulsive bodies is in direct contact with the pair of side gears.

2. The differential device of claim 1, wherein each of the side gears includes a hub section rotatably fitting on the casing and a gear section meshing with the pinion gears, and is set in place by contact only of the hub section onto the casing.

3. The differential device of claim 2, wherein the friction clutches are interposed between back faces of the gear sections and the inner periphery of the casing.

4. The differential device of claim 1, wherein the friction clutches are respectively multi-plate clutches.

5. The differential device of claim 1, wherein each of the repulsive bodies is a disc spring tapered in a direction toward the side gears.

* * * * *